Patented Nov. 19, 1935

2,021,137

UNITED STATES PATENT OFFICE 2,021,137

WATER REPELLENT COATINGS AND MATERIALS COATED WITH SAME

Irwin Stone, New York, N. Y.

No Drawing. Application May 19, 1932,
Serial No. 612,381

2 Claims. (Cl. 99—8)

This invention relates to the production of water resistant coatings as well as the products prepared with the aid of such coatings, which involve the property of inhibiting the growth of micro-organisms on the coated surface and in contiguous aqueous material, commonly referred to as antiseptic properties.

The type of products I have in mind particularly as forming the basis for my invention are materials such as; paper, wood etc. impregnated or coated with paraffin or a similar waxlike mixture to serve as the material for the production of containers for food products or for use in other articles in which bacterial flora is undesirable. Many such articles occur in commerce such as wax paper, waxed paper cartons, paper drinking cups, drinking straws, toothpicks, medical tongue depressors, milk bottle caps etc., which either come directly in contact with food destined for human consumption or which are otherwise equally desirable to protect from contamination by micro-organisms. For example in the case of the drinking straws, the desirability of preventing growth of micro-organisms on the surface of such straws as a sanitary measure for the protection of the public hardly needs further comment.

It is obvious that my invention is equally applicable to impregnated substances other than paper and to protective coatings applied directly to paper and other products. As an example of this case may be mentioned toothpicks, tongue depressors and corks.

The commonly used and known germicides such as phenol, cresols, mercuric chloride, formaldehyde, hypochlorites etc. are unsuitable for the purposes of this invention in which the coating comes in contact with or used in association with food products or comes in contact with the tissues of the body. Objections to the use of such germicidal materials in coatings are those of toxicity caustic effect, insolubility, instability and especially the unpleasant odors and tastes. In addition it must be noted that none of the common germicides are adapted for the special type of antiseptic result to be expected. Many are unsuitable by reason of the lack of solubility in the waxlike water-resistant coating mixture. Those like phenol, cresol etc. are soluble, but are found not to penetrate out from the wax substance forming the coating, in which they are dissolved, in sufficient amounts to exert a continuous antiseptic effect except when used in huge proportions when their toxicity and unpleasant odors and tastes render them impossible to use.

What is desired is a substance soluble in wax yet possessing a limited solubility in aqueous fluid and possessing tremendously potent growth-inhibiting powers though not necessarily quick germ killing action in extremely low dilution; such as will enable its use dissolved in the wax coating in low proportions (of the order of 1 part in 1000) and yet result in the desired antiseptic and growth-inhibiting properties. Further desired properties of the ideal substances, of course, are that they should be absolutely non-toxic and in the low dilution in which the above properties are exhibited they should not impart any undesirable odor or taste to the coating mixture.

I have found that 8 hydroxy quinoline, its oil soluble salts such as benzoate or palmitate or the derivatives of 8 hydroxy quinoline formed by substituting groups in place of the hydrogen of the hydroxy group such as acetyl 8 oxyquinoline, answer the qualifications set forth in the previous paragraph. When these compounds are dissolved in the waterproofing mixture in amounts between 0.02% to 0.25% they render the mixture antiseptic, inhibit the growth of micro-organisms in adjacent aqueous materials, and the mixture is non-toxic and substantially odorless and tasteless.

As an example of the coating's use its application to drinking straws may be cited. These drinking straws are at present manufactured by spirally winding two narrow strips of paper to form the well-known, thin, hollow tube. At a point in the manufacture of these straws they are impregnated with molten paraffin in order to render the paper waterproof. Without any change in the usual manufacturing process these straws are made substantially antiseptic and germproof by incorporating 0.1% of 8 hydroxy quinoline benzoate in the aforementioned paraffin and then impregnating with this treated paraffin in the usual manner.

A further application of this coating is in the manufacture of medical tongue depressors or toothpicks. After the wood is fashioned into the shapes desired it is "tumbled" in a rotating drum with small pieces of the following mixture so that the friction of the moving materials causes a thin layer of this water resistant antiseptic mixture to deposit on the surfaces of the wooden implements. The mixture is composed of—

| | Parts |
|---|---|
| Paraffin | 95 |
| Mineral oil | 5 |
| 8 hydroxy quinoline | 0.1 |

An antiseptic wax paper may be made by impregnating suitable paper stock with a mixture of paraffin containing 0.1% of 8 hydroxy quinoline benzoate. The impregnation may be carried out by any of the methods now in use for the production of waxed paper, such as quickly running the paper, in long sheets, through a bath of hot molten paraffin. This waxed paper may be used as such or fashioned into other articles such as paper cups, dishes, cartons, milk bottle caps, stopper liners etc. In some of the present manufacturing processes for making these paper implements the waterproofing coating is applied after the article is fashioned. This invention, of course, equally applies to these cases.

I do not limit this invention to the foregoing examples nor to the previously cited coating compositions—any waxlike or oily body may be substituted if it serves as a better water resistant base for the specific case in hand. The proportion of the antiseptic agents may also be varied for the particular case: for instance if the coating material is an oil only 0.05% of the antiseptic agents is necessary to give the mixture the desired antiseptic properties.

The term "antiseptic", as used by me in connection with the coating composition or coated product, refers to the growth inhibiting properties of the coating toward micro-organisms on the surfaces and aqueous material in the vicinity of such coated surfaces. To meet the requirements of this definition of antiseptic action, the coating or coated materials must show, when placed in contact with a nutrient agar medium containing a strain of bacteria and incubated, a distinct zone in the agar surrounding the area of contact in which no perceptible growth of the inoculated organism has occurred, while surrounding this sterile zone there will, of course, appear the usual evidences of bacterial growth in the shape of numerous visible colonies of the inoculated organism. This test of antiseptic action is similar to the test promulgated by the U. S. Department of Agriculture in its Circular #198 (Dec. 1931).

I claim as my invention:

1. The method of coating fibrous materials so as to render them water repellent and antiseptic consisting in applying to such surfaces a waxy coating having dissolved therein a small quantity of 8 hydroxy quinoline.

2. As an article of manufacture a fibrous material impregnated with a waxy substance having dissolved therein 8 hydroxy quinoline in relatively small amounts so as to render the surface water repellent and antiseptic.

IRWIN STONE.